Feb. 15, 1944.  J. A. JACKSON  2,341,991
INJECTING MECHANISM FOR DENTAL FLASKS
Filed Nov. 21, 1941  2 Sheets-Sheet 1

John A. Jackson
INVENTOR.
BY Harold E. Stonebraker,
ATTORNEY.

John A. Jackson
INVENTOR.

BY Harold E. Stonebraker,
ATTORNEY.

Patented Feb. 15, 1944

2,341,991

UNITED STATES PATENT OFFICE 2,341,991

INJECTING MECHANISM FOR DENTAL FLASKS

John A. Jackson, Albion, N. Y.

Application November 21, 1941, Serial No. 419,842

5 Claims. (Cl. 18—30)

This invention relates to a dental flask and injecting mechanism therefor, and it has for its object the provision of a simple construction for supplying additional plastic material under continuous and substantially uniform pressure to a denture while the latter is being cured in the mold to compensate for the shrinkage of the material in the mold.

A more particular object of the invention is to afford a structure comprising a minimum number of parts of low cost to manufacture which can be quickly applied to a dental flask and readily operated to inject plastic material under suitable pressure to a denture during the curing process, so as to produce a denture possessing a high degree of perfection and with a minimum waste of plastic material.

Heretofore some effort has been made to inject plastic material into a dental mold during the curing process, but such devices offer serious objections in that there is an opportunity for particles of the plaster forming the mold to be carried along with the plastic material and find their way into the finished denture, furthermore it has sometimes been difficult to maintain the injected material in a proper plastic state until it reaches the denture, and it is a purpose of the invention to overcome these difficulties by injecting the plastic material in such a manner that it does not come in contact with the plaster of the mold and by maintaining it in a proper plastic state without hardening until it reaches the denture.

Another object of the invention is to provide a mechanism that can be used with a conventional dental flask and can be quickly and readily controlled to maintain a continuous pressure of proper degree on the plastic material and denture during the curing process.

Still an additional purpose of the invention is to afford an injecting mechanism in which parts can be quickly detached to permit inserting a fresh supply of plastic material in the event that the initial charge is entirely absorbed by the denture during curing.

A more specific object of the invention is to provide an injecting mechanism applicable to a flask in such a manner as to force plastic material toward the denture through a metal foil covered passage formed between the upper and lower sections of the plaster mold and along the top of the lower section at the rear of the flask, whereby the injected plastic material does not come in contact with the plaster of the mold and is forced from the rear of the flask at a point adjacent to the plane separating the flask sections toward the rear of the denture, and has a minimum distance to travel from the rear wall of the flask to the rear area of the denture.

To these and other ends, the invention consists in the construction and arrangement of parts that will appear clearly from the following description when read in conjunction with the accompanying drawings, the novel features being pointed out in the claims following the specification.

Figure 10:
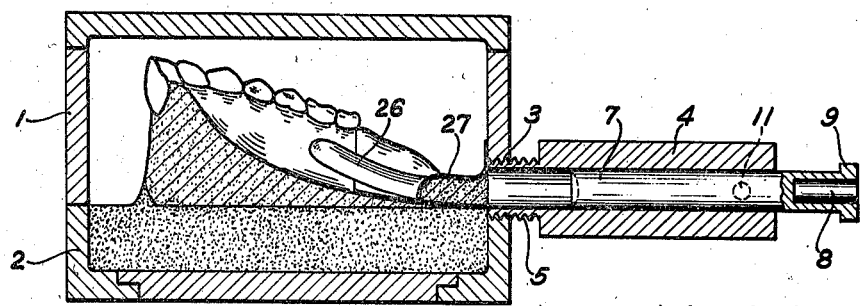
Fig. 10 is a vertical sectional view taken centrally through the injecting mechanism and flask, showing the wax sprue covered with metal foil, preparatory to investing the upper section of the flask.

Referring more particularly to the drawings in which like reference characters refer to the same parts throughout the several views, 1 and 2 designate the upper and lower sections respectively of a conventional dental flask, provided in its rear wall with a threaded opening 3 that is formed for the most part in the upper section 1 and somewhat overlaps the lower section 2, see Figs, 3 and 4, so that when the injecting mechanism barrel is attached to the flask, the piston which forces the plastic material into the flask will be located above the lower section of the flask, the lowermost point of the piston, referring to Fig. 10, being preferably coincident with the plane separating the two sections of the flask, for a purpose that will appear presently.

Figure 3:
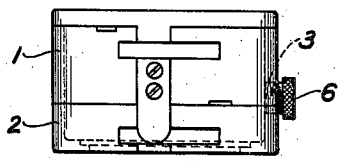
Fig. 3 is a side elevation similar to Fig. 2, with the injecting mechanism removed and the injecting opening closed by a plug provided for the purpose.
Figure 4:
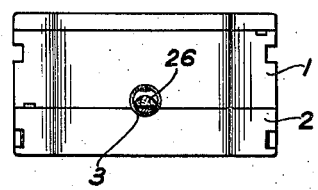
Fig. 4 is a rear elevation of the flask with the injecting mechanism removed, and showing the opening in the flask through which the plastic material is injected.
Figure 5:
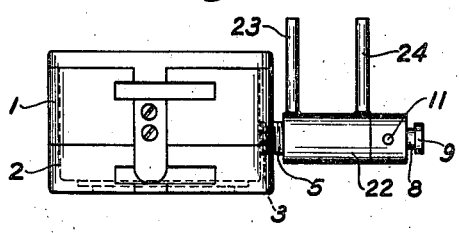
Fig. 5 is a side elevation showing the barrel and piston of the injecting mechanism in operating position, and in conjunction therewith a barrel cooling means for retaining the injected material in a plastic state, the piston operating plunger and its supporting means being removed.

The injecting mechanism preferably includes a barrel 4 having a longitudinal opening from which plastic material is forced into the mold and denture during the curing process, and a threaded neck 5 which engages the threaded opening 3 in the flask when the injecting mechanism is attached. 6 designates a plug used to close the opening 3 in the flask when it is desired to use the latter without the injecting mechanism, see Fig. 3. 7 designates a piston movable in the opening in the barrel and removable therefrom to permit the insertion of plastic material, the piston 7 being provided with a recess 8 in its outer end to receive the inner end of the piston operating plunger to be described presently, while 9 designates a head or overhanging portion on the piston that engages the outer end of the barrel and limits the inward movement of the piston 7.

Figure 1:
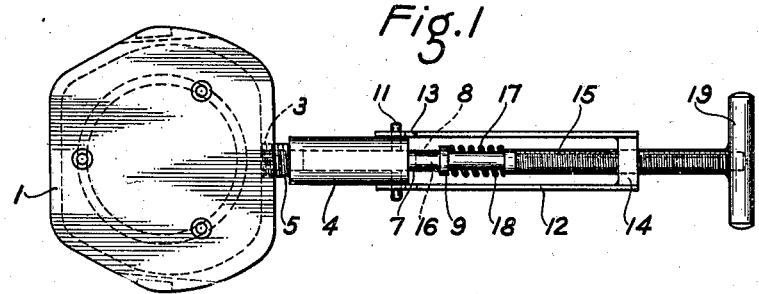
Fig. 1 is a plan view of a dental flask, showing one practical embodiment of the invention in operative position.
Figure 2:
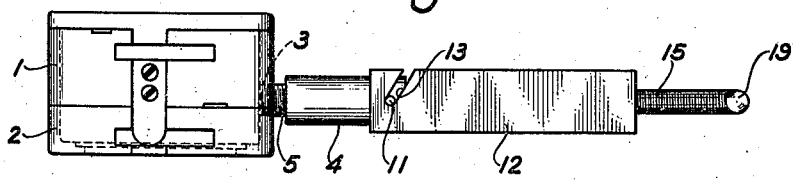
Fig. 2 is a side elevation of the same.

The barrel is provided with pivotally supported and preferably detachable means for actuating the plunger to move it inwardly of the barrel, and to this end the barrel is provided with oppositely disposed outwardly extending pins or trunnions 11 upon which there is removably pivoted a yoke supporting frame including opposite side plates 12, which are slotted at 13 to engage removably the trunnions 11. The side plates 12 are connected at their outer ends by a cross-head 14, threaded to receive the threaded stem 15 of a piston operating plunger, which has a reduced inner end 16 that engages and is guided in the recess 8 of the piston, while 17 designates a spring surrounding the reduced portion 18 of the piston operating plunger, and arranged to be compressed between the enlarged or body portion 15 of the operating plunger and the head 9 at the outer end of the piston 7, see Fig. 1, so as to effect a steady yielding pressure on the piston.

19 designates a handle at the outer end of the piston operating plunger by which the latter can be turned to force the piston inwardly of the barrel to inject and maintain constant pressure on the plastic material. During this action of the piston operating plunger, the side plates 12 are pulled outwardly with relation to the barrel against the trunnions or pins 11, and the operating plunger exerts a constant yielding pressure on the piston through the spring 17 which acts as a cushion between the operating plunger and the piston. The required pressure on the plastic material can readily be maintained by the operator during the curing process by turning the handle 19 whenever the tension on the spring is relieved.

Figure 6:
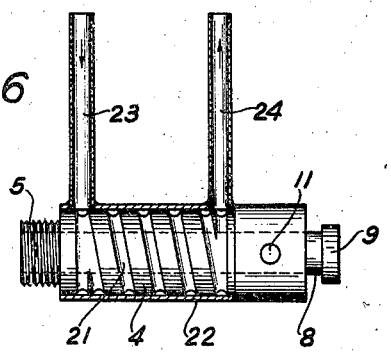
Fig. 6 is a detailed sectional view taken centrally of the cooling jacket of Fig. 5.
Figure 7:
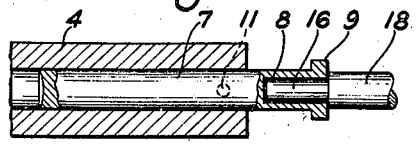
Fig. 7 is a detailed longitudinal sectional view taken centrally through the barrel, piston and piston operating plunger.

In order to maintain the injected material in a proper plastic state as it enters the mold, there is preferably provided a cooling means around the barrel through which the plastic material is forced into the flask. To accomplish this, the barrel may be provided with a spiral recess 21 in its outer surface, see Fig. 6, while 22 designates a sleeve or jacket surrounding the barrel and rigidly attached thereto by soldering or in any other convenient way, the jacket being provided with inlet and outlet pipes 23 and 24 respectively, the inlet pipe 23 being connected with any suitable source of cold water supply and the outlet pipe 24 connected with a drain outlet. The plastic material is formed into a cylinder by rolling between the fingers and is inserted into the opening at the outer end of the barrel, after which the piston is positioned in the barrel behind the plastic material and the piston operating plunger assembled. The cooling means just described serves to prevent hardening of the plastic material until it reaches the area of the denture and is subject to the heat of the curing process.

One advantage of the invention lies in the fact that the plastic material is injected between the upper and lower sections of the mold, and therefore may enter through a passageway surrounded entirely by metal foil and protected from contact with the plaster of the mold, thus avoiding the possibility of particles of plaster being carried in with the plastic material and imbedded in the denture.

Figure 8:
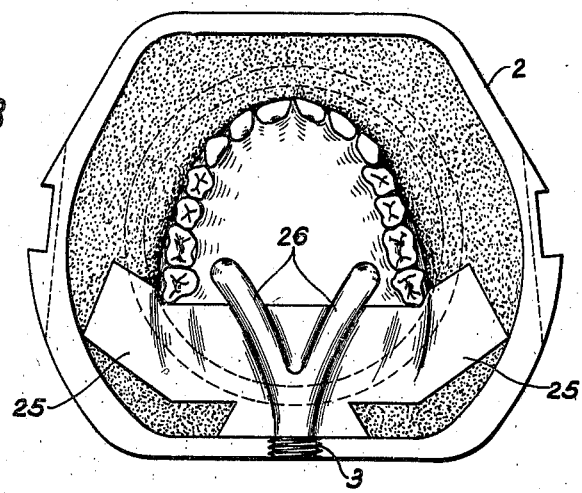
Fig. 8 is a plan view of the lower section of the flask and mold showing the waxed case and the wax sprue that forms the passage between the mold sections through which the plastic material is injected, the upper section of the flask being removed.
Figure 9:
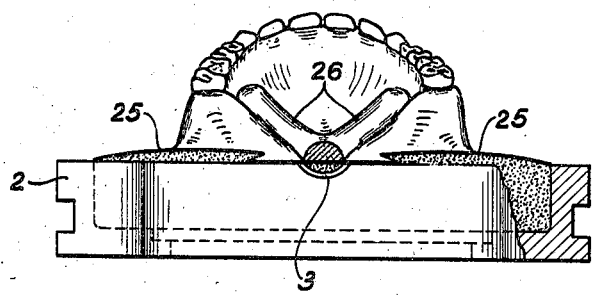
Fig. 9 is a rear elevation of the parts shown in Fig. 8.

The manner in which the passageway for the plastic material is formed will be apparent from Figs. 8 to 10, which show the lower section of the flask and mold carrying the waxed case, over which the pieces of metal foil 25 are positioned. Following this, a generally Y-shaped wax sprue 26 of circular cross-section is formed and positioned on the metal foil 25 with its central portion abutting the opening in the flask and its branches leading to the sides of the rear area of the denture. After the upper section is positioned as in Fig. 10, the wax sprue is shaped adjacent the opening in the flask as shown and the top surfaces of the wax sprue 26 are covered with metal foil 27 so that when the upper section of the flask is invested and boiled out to remove the wax, there will remain a passage for the plastic material defined between the metal foil layers 25 and 27, and having a shape determined by the wax sprue 26 leading from the threaded opening in the flask to the opposite rear portions of the denture.

It will be understood that after the investment is completed and the wax removed in the conventional manner, the mold is filled with the plastic material and the flask sections are clamped together as usual and the flask placed in boiling water for curing. Thereupon the opening in the barrel 4 is filled with a charge of the plastic material being used, the piston 7 is inserted into the barrel against the plastic material therein, and the yoke support is assembled on the barrel with the operating plunger engaged with the piston. Then as the plunger is turned, the piston is moved inwardly under yielding spring pressure to inject the plastic material through the passage surrounded by the metal foil and to the opposite sides of the rear area of the denture. If piston 7 reaches the inward limit of its movement and more plastic material is required, a fresh charge can be quickly inserted by turning the handle 19 of the operating plunger in a reverse direction to withdrawn it from the yoke support sufficiently to withdraw the inner end 16 of the plunger from the piston and thus permit the plunger and yoke to be swung at right angles to the piston and barrel. The piston 7 can then be removed and a fresh charge of plastic material placed in the barrel, the piston reinserted, and the yoke support and operating plunger swung back into alinement therewith so that the operating plunger can be reengaged with the piston and the operation repeated.

While the invention has been described with reference to the specific arrangement shown, it is not limited to the details of construction disclosed, and this application is intended to cover such modifications or departures as may come within the purposes of the improvement and the scope of the following claims.

I claim:

1. In a dental flask having an opening therein, a barrel detachably secured to the flask and having a cylindrical opening of uniform diameter extending throughout the length of the barrel and communicating with said opening in the flask, and a piston removably positioned in the barrel and having an opening in its outer end, a yoke supporting member pivotally mounted on the barrel and removable therewith, a piston operating plunger threaded in the yoke supporting member and having a reduced end engageable with an opening in said piston to move the latter in the barrel, a shoulder on the plunger, and a spring surrounding said reduced end of the plunger and located between the shoulder of the plunger and the outer end of the piston.

2. In a dental flask having an opening therein, a barrel detachably secured to the flask and having a cylindrical opening of uniform diameter extending throughout the length of the barrel and communicating with said opening in the flask, and a piston removably positioned in the barrel and having a recess in its outer end, a supporting member pivotally mounted on the barrel and removable therewith, a piston operating plunger threaded in the supporting member and having a shoulder and a reduced inner end engaging said recess in the piston, and a spring surrounding the reduced end of the plunger and located between the piston and the shoulder on the plunger.

3. In a dental flask having an opening therein, a barrel detachably secured to the flask and having a cylindrical opening of uniform diameter extending throughout the length of the barrel and communicating with said opening in the flask, and a piston removably positioned in the barrel and having a recess in its outer end, trunnions oppositely disposed on the barrel, a yoke supporting member including side plates having inclined slots therein extending from one edge and detachably and pivotally engaging said trunnions, a head connecting said side plates and having a threaded opening, a piston operating plunger threaded in said opening and having a reduced end engaging the recess in said piston, said plunger including a shoulder, and a spring surrounding the reduced end of the plunger and located between the outer end of the piston and the shoulder on the plunger.

4. In a dental flask having an opening therein, a barrel detachably secured to the flask and having a cylindrical opening communicating with said opening in the flask, said opening being of uniform diameter and extending throughout the length of the barrel, and a piston removably positioned in the barrel, a yoke supporting member pivotally mounted on the barrel, a piston operating plunger threaded in the yoke supporting member and engageable with said piston to move the latter in the barrel, a shoulder on the plunger, a spring surrounding the plunger and located between said shoulder and the outer end of the piston, and water cooling means surrounding the barrel in close proximity to the flask.

5. In a dental flask having a threaded opening therein, a barrel detachably secured to the flask and having a cylindrical opening communicating with said opening in the flask, said opening being of uniform diameter and extending throughout the length of the barrel, a threaded end on the barrel engaging said threaded opening, and a piston removably positioned in the barrel and having a recess in its outer end, trunnions oppositely disposed on the barrel, a yoke supporting member including side plates having inclined slots extending from their edges and detachably and pivotally engaging said trunnions, a head connecting said side plates and having a threaded opening, a piston operating plunger threaded in said opening and having a reduced end engaging said recess in the piston, a shoulder on the plunger, a spring surrounding the reduced end of the plunger and located between the outer end of the piston and the shoulder on the plunger, the barrel having a spiral recess in its periphery extending from said threaded end outwardly, a water jacket surrounding said spiral recessed portion of the barrel and attached thereto, and inlet and outlet conductors connected to the jacket.

JOHN A. JACKSON.